United States Patent [19]

Bennett

[11] Patent Number: 4,802,496
[45] Date of Patent: Feb. 7, 1989

[54] AGRICULTURAL CONCAVE ADJUSTMENT MEANS

[75] Inventor: Robert E. Bennett, Moline, Ill.
[73] Assignee: Deere & Company, Moline, Ill.
[21] Appl. No.: 51,962
[22] Filed: May 19, 1987
[51] Int. Cl.$^4$ ............................................. A01F 12/28
[52] U.S. Cl. ................................... 130/27 S; 130/27 J
[58] Field of Search ................... 130/27 L, 27 J, 27 S, 130/27 E, 27 R; 56/16.5

[56] References Cited

U.S. PATENT DOCUMENTS 3,734,103  5/1973  Mathews ............................ 130/27 L
3,949,761  4/1976  Mortier et al. ..................... 130/27 L
4,484,588  11/1984  Hubman et al. .................. 130/27 L

FOREIGN PATENT DOCUMENTS 98894  5/1940  Sweden ............................ 130/27 L
211195  4/1966  U.S.S.R. ............................ 56/27 L Primary Examiner—John Weiss

[57] ABSTRACT

An assembly for adjusting the spacing between a transverse threshing cylinder and a transverse concave. The adjustment assembly comprising a link pivotally mounted to the side of the combine and circular camming disc which is located in the link. The camming disc is provided with a sleeve which projects into the combine and which is operatively coupled to a transversely extending hexagonal shaft. The concave grips the sleeve and in response to rotation of the camming disc the spacing between the concave and the threshing cylinder is changed. The concave is pivotally coupled to the side sheet of the combine by a cylindrical bushing having a slot into which is inserted a loosely fitting retainer plate.

14 Claims, 3 Drawing Sheets

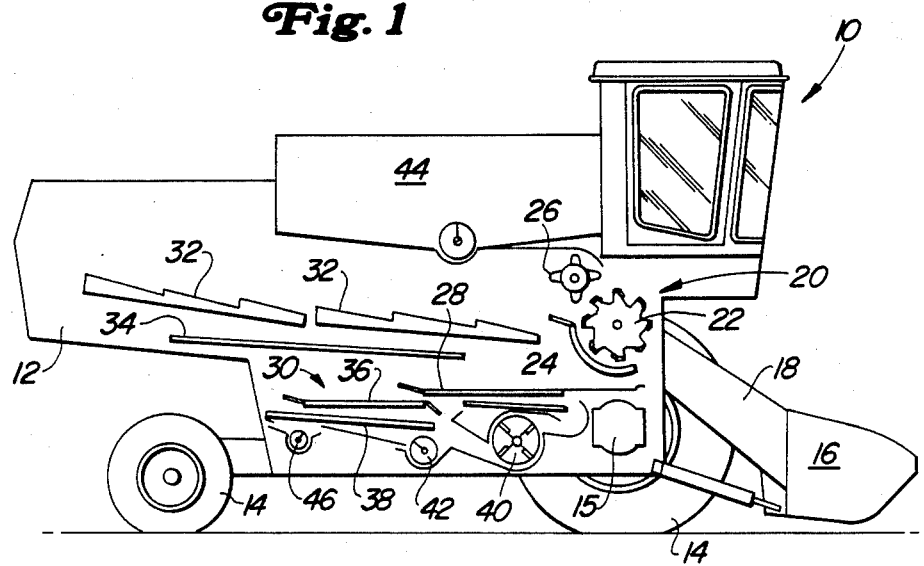

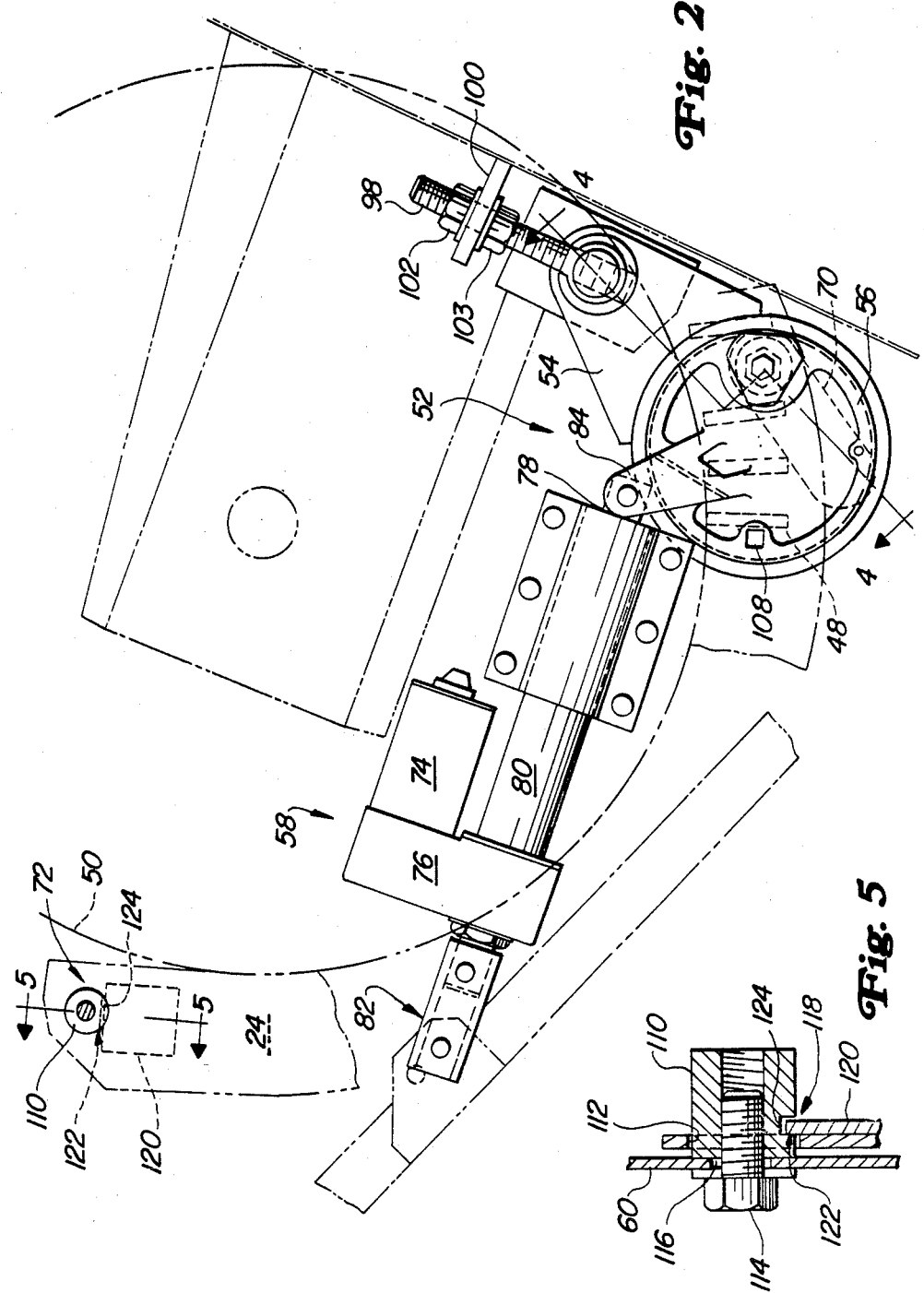

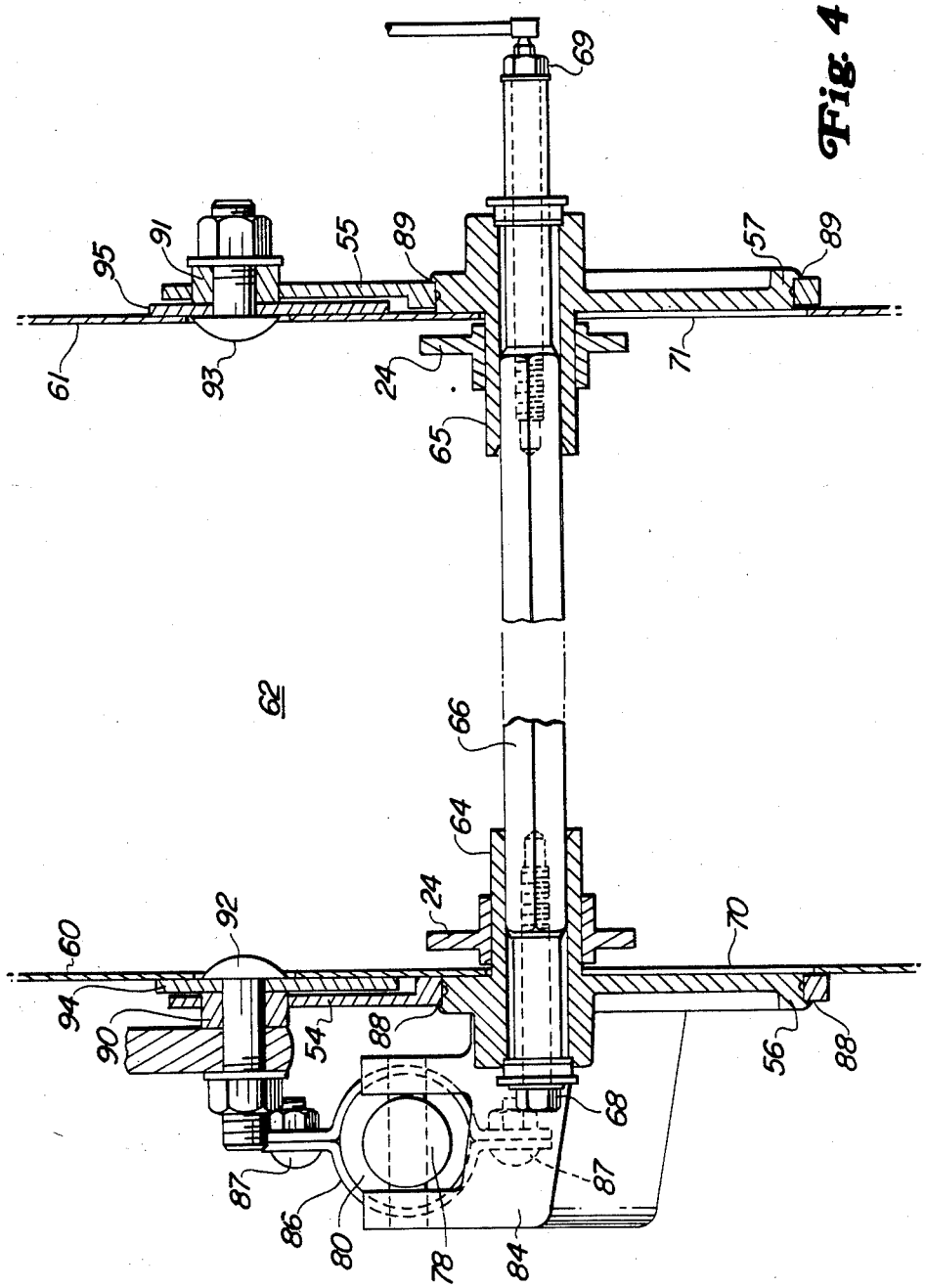

AGRICULTURAL CONCAVE ADJUSTMENT MEANS

BACKGROUND OF THE INVENTION

1. Field of the Invention

The invention is directed to a concave of an agricultural threshing machine which is pivoted about an axis that is parallel to the axis of the associated threshing cylinder. The concave is provided with an adjustment assembly for adjusting the relative spacing of the concave in relationship to the cylinder. In addition, the concave is pivotally mounted to the side sheets of the threshing machine by a cylindrical bushing that is locked to the concave by a retainer plate.

2. Description of the Prior Art

Typically, harvesting and threshing operations have been combined on a single machine called an agricultural combine. With conventional combines, the threshing cylinder and associated concave are transversely mounted between the side sheets of the combine. The side sheets forming the supporting structure of combine. Harvested grain is transported from the harvesting platform to the threshing means by a feeder house assembly.

The spacing between the threshing cylinder and concave must be adjusted for different crops and crop conditions. The rear of the concave is pivotally mounted to the side sheets whereas the front of the concave may be provided with a spacing adjustment assembly. One type of adjustment assembly currently used on production machines manufactured by the assignee of the present invention, comprises a transverse bar having a square cross section which extends across the front of the concave and which is operatively mounted at both ends to a circular cam, an adjustment arm, and a link assembly. By rotating the circular cam, the adjustment arm moves to concave up and down. The cam, adjustment arm and link are located inside the side sheets of the combine.

SUMMARY OF THE INVENTION

An adjustment assembly of the present invention is located at the front of the concave outside of the side sheets. By locating the assembly outside the side sheets, more room is provided for the separator means inside the combine. The adjustment means comprises a circular camming disc which is mounted in a link. The link is pivotally coupled to the outside of the side sheets of the combine. The camming disc has an inwardly projecting sleeve to which the hexagonal shaped transverse bar is mounted. One of the camming discs is provided with a moment arm which is operatively coupled to an actuator for rotating the disc. The moment arm comprises a fork to which is coupled a shaft that is operatively coupled to an electric motor. The shaft is slidably mounted in a cylinder. The cylinder is provided with a stop sleeve which engages the fork to prevent the concave from contacting the cylinder.

The rear of the concave is provided with an internally threaded cylindrical bushing having a slot. A retainer plate is welded to the concave and extends into the slot of the bushing thereby holding the bushing in place. A bolt extends from the outside of the side sheet through an aperture and engages the bushing. The bolt is heavily torqued so that the bushing and side sheet form a pinch joint. The retainer plate is only loosely received in the slot and allows for limited amounts of movement of the concave during adjustment.

BRIEF DESCRIPTION OF THE DRAWINGS

FIG. 1 is a semi-schematic side view of an agricultural combine.

FIG. 2 is a side view of the adjustment assembly together with the pivot assembly.

FIG. 3 is a side view of the adjustment assembly in its open configuration.

FIG. 4 is a cross sectioanl view taken along line 4—4.

FIG. 5 is a cross sectional view taken along line 5—5.

DETAILED DESCRIPTION

FIG. 1 illustrates a self-propelled combine 10 having supporting structure 12 and ground engaging wheels 14. The combine is provided with an engine (not shown) for driving the ground engaging wheels through motor 15 and also for powering the operating means. An agricultural crop in a field is harvested by harvesting platform 16 which directs the harvested crop up through feeder house 18 to threshing means 20. The threshing means comprises transverse threshing cylinder 22 and associated concave 24 together with beater 26. Grain and chaff fall from threshing concave 24 onto pan 28 which maybe provided with a transport auger (not shown) for directing the grain and chaff to cleaning shoe 30. Straw and residual grain is directed from the beater to oscillating straw walkers 32 which drive the straw out the rear of the combine. Residual grain and chaff falling from the straw walkers falls onto pan 34 which also maybe provided with a transport auger (not shown) for directing the grain to cleaning shoe 30.

The cleaning shoe comprises an oscillating or reciprocating chaffer 36 and sieve 38. Blower 40 directs an air stream upwardly against the underside of the chaffer and sieve, blowing chaff out the rear of the combine. Grain passing through the chaffer and sieve is directed to clean grain auger 42 which transports the grain to storage compartment 44. Tailings, that is unthreshed heads of grain and other heavier trash, are directed to tailings auger 46 which reintroduces the tailings to the threshing means.

Concave 24 is an arcuate shaped member having a plurality of transverse bars 48. The threshing cylinder is provided with a series of circumferentially arranged and transversely extending rasp bars which together with the transverse bars of the concave define a spacing. Circle 50 illustrated in FIG. 2 illustrates the cross sectional area occupied by the rotating threshing cylinder. The spacing between the transverse concave bars 48 and the transverse rasp bars of the cylinder must be adjusted for different crops and different harvesting conditions. For example, small grains, such as wheat, require a smaller spacing, than larger grains such as corn.

The spacing is adjusted by adjusting means 52 which comprises pivotable links 54 and 55, camming discs 56 and 57, and means for rotating the camming disc 58. The link, camming disc and means for rotating are all located on the exterior surface of the combine side sheets 60 and 61. The two side sheets form a portion of the supporting structure and define interior space 62 of the combine in which the separating means are located.

Circular camming discs 56 and 57 are provided with inwardly projecting sleeves 64 and 65, respectively. The sleeves are provided with hexagonal apertures which operatively engage hexagonal shaft 66. The camming discs are secured to shaft 66 by bolts 68 and 69 as illustrated in FIG. 4. Each sleeve passes through an elongated aperture 70 and 71 formed in each side sheet of the combine. As camming disc 56 is rotated, hexagonal shaft 66 identically rotates camming disc 57. Rotating the camming discs moves the sleeves up and down in apertures 70 and 71 formed in the side sheets of the combine. Concave 24 is mounted to the sleeve as illustrated in FIG. 4, and rotates about pivot point 72 changing the spacing between the threshing cylinder and the concave.

Camming disc 56 is rotated by rotating means 58 and through hexagonal shaft 66 rotates camming disc 57. The rotating means comprises electric motor 74, gear case 76, reciprocating shaft 78, and cylinder 80. A portion of shaft 78 that cooperates with the gear case is threaded so that as the gear case is driven, it moves the shaft in and out of the cylinder. The rotating means is mounted to the supporting structure of the combine at 82.

The reciprocating shaft is coupled to integral fork 84 extending out from camming disc 56. The fork forms a moment arm for rotating the disc as the reciprocating shaft is extended or retracted. Frictionally engaging the sidewalls of the cylinder is two-piece sleeve 86 forming a rotational stop for the fork. The portions of the sleeve are bolted to one another by bolts 87. The sleeve is positioned along cylinder 80 so that when the fork contacts the sleeve the concave is only a few millimeters from the threshing cylinder rasp bars. In this way the concave is prevented from coming into contact with the rotating cylinder and damaging the combine.

FIG. 2 illustrates the smallest spacing between the threshing cylinder and concave, whereas in FIG. 3 the spacing between the threshing cylinder and concave is close to maximum. When the reciprocating shaft 78 is fully retracted, the spacing is reduced and fork 84 engages stop 86. When shaft 78 is extended, the spacing enlarges to accommodate larger grains.

The camming discs are provided with protruding edges 88 and 89 which trap the associated link between the cam and the side sheets of the combine. In addition, the camming discs and links are sized to cover elongated apertures 70 and 71 and prevent the loss of grain through these apertures.

Links 54 and 55 are pivotally coupled to the side sheets of the combine by cylindrical bushings 90 and 91. The bushings are coupled to the side sheets of the combine by bolts 92 and 93 passing through the side sheets and reinforcing plates 94 and 95. The reinforcing plates are welded to the side sheets. Reinforcing plate 94 is provided with an elongated slot so that the vertical position of the pivot point of the link can be adjusted by the vertical adjusting means 96.

Link 54 is provided with vertical adjustment means 96 which is used for leveling the concave relative to the threshing cylinder. Adjustment means 96 comprises threaded bolt 98 which is coupled to flange 100 which extends outwardly from side sheets 60 of the combine. By rotating nuts 102 and 103, the bolt is moved up and down thereby controlling the vertical pivot point location of link 54. As the concave is only being leveled with respect to the threshing cylinde,r a second vertical adjustment means for link 55 is unnecessary.

The camming disc is provided with a square hole 108 into which a wrench can be inserted for manually rotating the camming disc and adjusting the spacing between the threshing cylinder and concave.

The concave is pivotally mounted to the combine at pivot point 72. Cylindrical bushing 110 is positioned in round aperture 112 formed in the concave. The bushing is provided with an internal threaded opening which engages mounting bolt 114. The mounting bolt is inserted through aperture 116 formed in side sheet 60. The bolt is heavily torqued and forms a pinch joint between the side sheet and the bushing. The bushing is also provided with slot 118 which is adapted to receive retainer plate 120. The retainer plate 120 is welded to the concave and is loosely received in the slot. More specifically, a small space 122 is provided between the retainer plate and top edge 124 of the slot to provide for limited pivoting motion of the concave without loosening or further tightening the bolt and bushing. In this way, adjusting the concave will not loosen or tighten the bolt and bushing. The retainer plate prevents the bushing from becoming separate from the concave, and as such facilitates fabrication and maintenance of the concave. Although only the right-hand pivot point is illustrated, it should be noted that a second identical pivot point is located at the left-hand side of the concave.

The present invention should not be limited to the above-described embodiments, but should be limited solely by the claims that follow.

I claim:

1. An agricultural combine for harvesting and threshing an agricultural crop, the combine comprising:
   a supporting structure defining an internal area;
   ground engaging means for supporting the supporting structure above a field;
   harvesting means for harvesting a crop from a field, the harvesting means extends from the supporting structure;
   threshing means for threshing the harvested crop, the threshing means having a transverse threshing cylinder and a transverse concave between which the crop is directed, the cylinder and concave are mounted in the internal space of the supporting structure and together define a relative spacing;
   feeder house means mounted on the supporting structure for transporting the harvested crop from the harvesting means to the threshing means;
   adjustment means for adjusting the relative spacing between the cylinder and concave, the adjustment means comprising two links pivotally coupled to the supporting structure outside and on opposite sides of the internal area, two camming discs each being rotatingly mounted inside one of the links outside the internal area, each of the camming discs provided with an inwardly projecting sleeves extending into the internal spaces and contacting the concave, and a transverse rod operatively coupled to both camming discs, whereby when the camming disc is rotated, the relative spacing between the concave and cylinder is adjusted by the inwardly projecting sleeves moving the concave.

2. An agricultural combine as defined by claim 1 further comprising a means for rotating the camming disc which is mounted to the supporting structure of the combine.

3. An agricultural combine as defined by claim 2 wherein at least one of the camming discs is provided with a fork which is operatively coupled to the means for rotating the camming disc.

4. An agricultural combine as defined by claim 3 wherein the means for rotating the camming disc comprises an electric motor which is operatively coupled to a shaft which moves inwardly and outwardly from a hollow receiving cylinder in response to the electric motor.

5. An agricultural combine as defined by claim 4 wherein the receiving cylinder of the means for rotating the camming disc is provided with an adjustable stop for limiting the rotation of the camming disc by contacting the fork.

6. An agricultural combine as defined by claim 5 comprises a sleeve that frictionally engages the receiving cylinder.

7. An agricultural combine as defined by claim 6 further comprising a leveling means which is coupled to at least one link and is used for adjusting the relative vertical position of the link to which it is attached.

8. An agricultural combine as defined by claim 7 wherein the camming disc is provided with a polygonal aperture which is adapted and constructed to be engaged by a wrench for manually rotating the camming disc.

9. An agricultural combine as defined by claim 1 wherein the concave is pivotally mounted to the supporting structure by a bolt passing through an aperture in the supporting structure that is threadily coupled to a bushing that is mounted to the concave.

10. An agricultural combine as defined by claim 9 wherein the bushing is provided with a bushing slot, and is mounted to the concave by a retainer plate that engages the bushing slot and is fixedly mounted to the concave, the bushing is cylindrical and projects through a circular opening in the concave.

11. An agricultural combine as defined by claim 10 wherein the cylindrical bushing is free to rotate to a limited degree in the circular opening, the degree of rotation being limited by the bushing slot and retainer plate.

12. An agricultural combine for harvesting and threshing an agricultural crop, the combine comprising:
   a supporting structure defining an internal area;
   ground engaging means for supporting the supporting structure above a field;
   harvesting means for harvesting a crop from a field, the harvesting means extends from the supporting structure;
   threshing means for threshing the harvested crop, the threshing means having a transverse threshing cylinder and a transverse concave between which the crop is directed, the concave is pivotally mounted to the supporting structure by a bolt passing through an aperture in the supporting structure that is threadily coupled to a bushing that is mounted to the concave, the bushing is provided with a bushing slot and is mounted to the concave by a retainer plate that engages the bushing slot and is fixedly mounted to the concave, the bushing is cylindrical and projects through a circular opening in the concave; and
   feeder house means mounted to the supporting structure for transporting the harvested crop from the harvesting means to the threshing means.

13. An agricultural combine as defined by claim 12 wherein the cylindrical bushing is free to rotate to a limited degree in the circular opening, the degree of rotation being limited by the bushing slot and retainer plate.

14. An agricultural threshing machine for threshing a harvested agricultural crop, the machine comprising:
   a supporting structure defining an internal area;
   ground engaging means for supporting the supporting structure above a field;
   threshing means for threshing the harvested crop, the threshing means having a transverse threshing cylinder and a transverse concave between which the crop is directed, the cylinder and concave are mounted in the internal space of the supporting structure and together define a relative spacing;
   adjustment means for adjusting the relative spacing between the cylinder and concave, the adjustment means comprising two links pivotally coupled to the supporting structure outside and on opposite sides of the internal area,
   two camming discs each being rotatingly mounted inside one of the links outside the internal area, each of the camming discs provided with an inwardly projecting sleeve extending into the internal space and contacting the concave, and a transverse rod operatively coupled to both camming discs, whereby when the camming disc is rotated the relative spacing between the concave and cylinder is adjusted by the inwardly projecting sleeves moving the concave.

* * * * *